(12) United States Patent
Sala et al.

(10) Patent No.: US 8,956,770 B2
(45) Date of Patent: Feb. 17, 2015

(54) METHOD FOR OPTIMIZING THE CONDUCTIVITY PROVIDED BY THE DISPLACEMENT OF H+ PROTONS AND/OR OH- IONS IN A CONDUCTIVE MEMBRANE

(75) Inventors: Béatrice Sala, St Gely du Fese (FR); Olivier Lacroix, Montpellier (FR); Stéphanie Willemin, Montpellier (FR); Kamal Rahmouni, Paris (FR); Hisasi Takenouti, Ollainville (FR); Arie Van Der Lee, Castelnau le Lez (FR); Philippe Colomban, Fresnes (FR); Patrice Goeuriot, Monistrol sur Loire (FR); Baroudi Benjeriou-Sedjerari, St Etienne (FR)

(73) Assignees: Areva, Paris (FR); Societe des Ceramiques Techniques, Bazet (FR); Armines, Paris (FR); Centre National de la Recherche Scientifique, Paris (FR)

( * ) Notice: Subject to any disclaimer, the term of this patent is extended or adjusted under 35 U.S.C. 154(b) by 896 days.

(21) Appl. No.: 12/602,199
(22) PCT Filed: May 30, 2008
(86) PCT No.: PCT/FR2008/050953
§ 371 (c)(1),
(2), (4) Date: Apr. 15, 2010
(87) PCT Pub. No.: WO2008/152317
PCT Pub. Date: Dec. 18, 2008

(65) Prior Publication Data
US 2010/0196767 A1 Aug. 5, 2010

(30) Foreign Application Priority Data
Jun. 1, 2007 (FR) .................................. 07 55418

(51) Int. Cl.
*H01M 8/00* (2006.01)
*H01M 8/10* (2006.01)
(Continued)

(52) U.S. Cl.
CPC ............ *B01D 53/326* (2013.01); *B01D 53/228* (2013.01); *C25B 1/12* (2013.01);
(Continued)

(58) Field of Classification Search
None
See application file for complete search history.

(56) References Cited

U.S. PATENT DOCUMENTS 5,733,435 A 3/1998 Prasad et al.

FOREIGN PATENT DOCUMENTS

EP 0 962 423 A1 12/1999
(Continued)

OTHER PUBLICATIONS

Kobayashi, Reduction of nitrogen oxide by a steam electrolysis cell using a proton conducting electrolyte, Oct. 1995, Solid State Ionics, 86-88, 603-607.*
(Continued)

*Primary Examiner* — Ula C. Ruddock
*Assistant Examiner* — Daniel Gatewood
(74) *Attorney, Agent, or Firm* — Pearl Cohen Zedek Latzer Baratz LLP

(57) ABSTRACT

The invention relates to a method for optimizing the conductivity provided by the displacement of H+ protons and/or OH– ions in a conductive membrane made of a material permitting the insertion of steam into said membrane, wherein said method comprises the step of inserting under pressure gaseous flow containing the steam into said membrane in order to force said steam into said membrane under a certain partial pressure so as to obtained the desired conductivity at a given temperature, said partial pressure being higher than or equal to 1 bar, a drop in the operational temperature being compensated by an increase in said partial pressure in order to obtain the same desired conductivity. The invention can be used in particularly interesting applications in the fields of high-temperature water electrolysis for producing hydrogen, of the manufacture of fuel cells using hydrogen fuel, and of hydrogen separation and purification.

23 Claims, 6 Drawing Sheets

(51) Int. Cl.
*C25D 17/00* (2006.01)
*C25B 1/02* (2006.01)
*B01D 53/32* (2006.01)
*B01D 53/22* (2006.01)
*C25B 1/12* (2006.01)
*C25B 13/04* (2006.01)
*H01M 8/04* (2006.01)
*H01M 8/12* (2006.01)

(52) U.S. Cl.
CPC .......... *C25B 13/04* (2013.01); *H01M 8/04119* (2013.01); *H01M 8/1246* (2013.01); *B01D 2256/16* (2013.01); *H01M 2300/0074* (2013.01); *Y02E 60/366* (2013.01); *Y02E 60/521* (2013.01); *Y02E 60/525* (2013.01)
USPC ............ 429/400; 429/486; 204/194; 205/637

(56) References Cited

FOREIGN PATENT DOCUMENTS

| | | | |
|---|---|---|---|
| EP | 0 964 466 A | 12/1999 | |
| EP | 962423 A1 | * 12/1999 | |
| EP | 964466 A1 | * 12/1999 | |
| WO | WO 2005093130 A1 | * 10/2005 | |

OTHER PUBLICATIONS

Kobayashi et al.: "Reduction of nitrogen oxide by a steam electrolysis cell using a proton conducting electrolyte", Solid State Ionics, NL, vol. 86-88, Jul. 1996, pp. 603-607.

Iwahara et al.: "Proton conduction in sintered oxides and its application to steam electrolysis for hydrogen production", Solid State Ionics, NL vol. 3-4, 1981, pp. 359-363.

Iwahara et al.: "High temperature type proton conductor based on SrCeO3 and its application to solid electrolyte fuel cells", Solid State Ionics, NL, vol. 9-10, 1983, pp. 1021-1025.

Uchida et al.: "Relation between proton and hole conduction in SrCeO3-based solid electrolytes under water-containing atmosphere at high temperatures", Solid State Ionics, NL, vol. 11, No. 2, 1983, pp. 117-124.

* cited by examiner

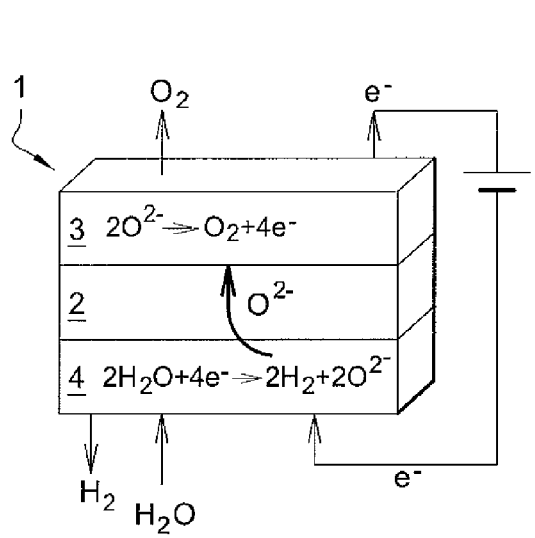
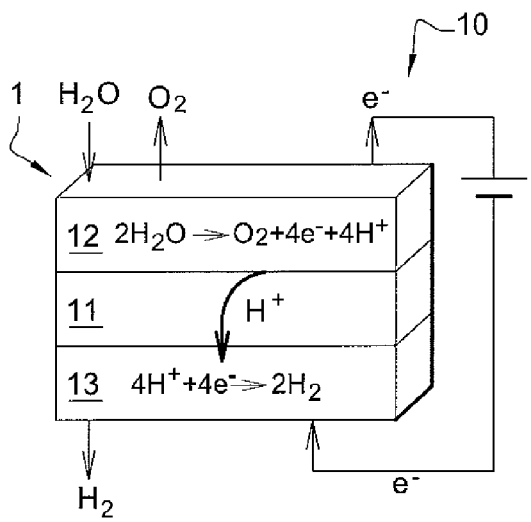
Fig. 1  Fig. 2
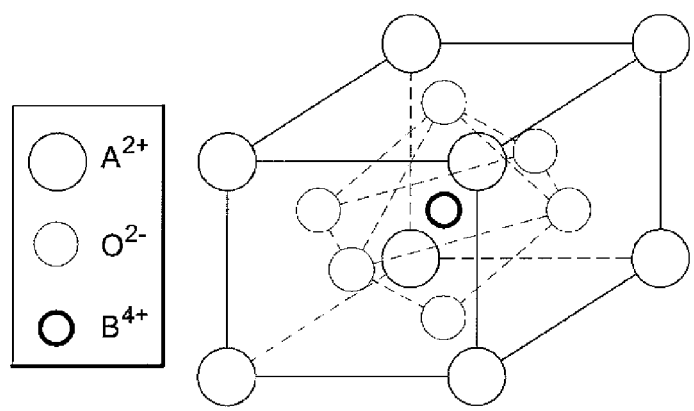
Fig. 3

METHOD FOR OPTIMIZING THE CONDUCTIVITY PROVIDED BY THE DISPLACEMENT OF H+ PROTONS AND/OR OH- IONS IN A CONDUCTIVE MEMBRANE

CROSS-REFERENCE TO RELATED APPLICATIONS

This application is a National Phase Application of PCT International Application No PCT/FR2008/050953, International Filing Date May 30, 2008, claiming priority of French Patent Application, 0755418, filed Jun. 1, 2007, both of which are incorporated by reference herein

FIELD OF INVENTION

The present invention relates to a method of optimising the conductivity provided by the displacement of H+ protons and/or OH- ions in a conductive membrane.

BACKGROUND OF INVENTION

The ion-conductive ceramic membranes are nowadays under intense investigation to increase their performances; they find particularly interesting applications in the following fields of:
high-temperature water electrolysis for the production of hydrogen,
the manufacture of hydrogen fuel cells,
separation and purification of hydrogen and its isotopes in comparison with carbon-based products.

Today, hydrogen ($H_2$) appears to be a very interesting energetic vector, which should become more and more important for the treatment of, among others, petroleum products, and could eventually favourably replace petroleum and fossil energies, whose stocks will strongly decrease over the next decades. In this perspective, it is, however, necessary to develop efficacious methods for hydrogen preparation.

Although numerous methods have been described for the synthesis of hydrogen from different sources, most of these methods are indeed not well adapted to the massive industrial production of hydrogen.

In this context, it can be mentioned, for example, the synthesis of hydrogen from hydrocarbons. One of the major problems of this synthetic route is that it produces, as by-products, important quantities of greenhouse gas, such as $CO_2$. In fact, currently, to produce 1 ton of hydrogen, 8 to 10 tons of $CO_2$ are released.

Methods for thermochemical conversions of water into hydrogen can also be mentioned, most of which cannot be transposed to industrial scale, in particular, the direct thermal decomposition of water, which would require unrealistic temperatures of about 3000 to 4000° K., which can, however, be reduced in the presence of catalysts.

Other types of thermochemical decompositions of water from sulfur, iodide or bromide catalysts require lower temperatures of 850° C. but induce severe corrosion problems avoiding their industrialisation.

The most promising route for the industrial production of hydrogen is the technique based on high-temperature steam electrolysis (known as HTE).

SUMMARY OF THE INVENTION

At the present time, two embodiments are presented:
the electrolysis using an electrolyte capable of conducting $O^{2-}$ ions and operating at temperatures generally comprised between 750° C. and 1000° C. illustrated in FIG. 1,
the electrolysis using an electrolyte capable of conducting protons and operating at temperatures generally comprised between 400° C. and 800° C. illustrated in FIG. 2.
A given electrolyte can be a protonic or ionic $O^{2-}$ conductor depending on the temperature.

FIG. 1 shows in a schematic manner an electrolyser (1) comprising an $O^{2-}$ ion conductive ceramic membrane (2) as an electrolyte separating an anode (3) and a cathode (4). A potential difference is applied between the anode (3) and the cathode (4). The $H_2O$ steam is reduced on the side of the cathode (4). The steam enters at the cathode (4) and is dissociated to form hydrogen ($H_2$) on the surface of the cathode and $O^{2-}$ ions. The $O^{2-}$ ions migrate through the electrolyte (2) to form oxygen ($O_2$) on the surface of the anode 3, with electrons ($e^-$) being released. On one side, oxygen is collected at the output of the electrolyser (1) and on the other side, hydrogen is collected, mixed with the rest of the steam.

FIG. 2 shows in a schematic manner an electrolyser (10) comprising a proton-conductive ceramic membrane (11) as an electrolyte separating an anode (12) and a cathode (13). A potential difference is applied between the anode (12) and the cathode (13). The $H_2O$ steam is electrolysed along the electrolyte (11) on the side of the anode (12). The steam enters at the anode (12) and is oxidised to form oxygen ($O_2$) and $H^+$ ions; with this reaction releasing electrons ($e^-$). The $H^+$ ions cross the electrolyte (11) to form hydrogen ($H_2$) on the surface of the cathode (13). On one side, hydrogen is then collected at the output of the electrolyser (10) and on the other side oxygen is collected, mixed with the rest of the steam.

DETAILED DESCRIPTION OF THE INVENTION

The proton-conductive electrolysis, such as the one illustrated in FIG. 2, shows two incontestable advantages compared to the $O^{2-}$ ion-conductive electrolysis:
a lower operating temperature allowing for the use of commercial structural materials without any problem of corrosion,
a high purity hydrogen production, as hydrogen is collected at the cathode with no need to separate it from water unlike for the $O^{2-}$ ion-conductive electrolysis.

These two advantages permit to reduce the cost of hydrogen production, thanks to a reduction in the cost of the installation.

However, this type of electrolysis is still in development at the laboratory level.

The objective of these studies is to obtain the maximum yield for the production of hydrogen. For that, the majority of used current needs to take place in the faraidic process, i.e. it needs to be used for the reduction of water and, therefore, for the production of hydrogen. For instance, the voltage used for the polarisation must be affected at least by
overvoltage at the electrodes
contact resistances on the electrode/electrolyte interfaces,
ohmic drop within materials, in particular inside the electrolyte.

In this context, the present invention is aimed at providing a method for optimising the conductivity of an ion-conductive membrane permitting the limitation of the ohmic drop within said membrane, which can be used in particular as an electrolyte for high-temperature water electrolysis for the production of hydrogen but also to manufacture hydrogen fuel cells or hydrogen purification devices.

In this purpose, the present invention provides a method for optimising the conductivity provided by the displacement of H+ protons and/or OH- ions in a conductive membrane made of a material permitting the insertion of steam into said membrane, wherein said method comprises the step of inserting under pressure gaseous flow containing steam in said membrane in order to force said steam into said membrane under a certain partial pressure so as to obtain the desired conductivity at a given temperature, said partial pressure being higher than or equal to 1 bar, with a drop in the operational temperature being compensated by an increase in said partial pressure in order to obtain the same desired conductivity.

By material permitting the insertion of steam into said membrane, it means a material capable of providing the adsorption and/or the absorption of steam into said membrane.

By gaseous flow containing the steam, it means a medium comprising water as vapour, eventually mixed with other gases. For instance, depending on the case, the term "partial pressure" will indicate either the total pressure of the gaseous flow in the case where this last one consists only of steam or the partial pressure of the steam in the case where the gaseous flow comprises other gases than steam.

Thanks to the present invention, the steam is forced under pressure into the membrane and this pressure is advantageously used to obtain the desired conductivity at a given temperature. As described below in reference to the figures, the applicant has observed that the increase of the partial pressure of the steam causes an increase in ion conductivity in the membrane. This correlation between the increase of partial pressure and the increase of conductivity allows working with materials operating at lower temperatures, with the reduction of conductivity due to an operation at a lower temperature being balanced by the increase of the partial pressure of the steam.

The method according to the present invention can also show one or more of the following characteristics, taken in isolation or according to any technically possible combination.

Preferably, the partial pressure of the steam is comprised between 1 bar and 100 bars; preferably the partial pressure is higher or equal to 10 bars and lower or equal to 100 bars and more preferably higher or equal to 15 bays.

Advantageously, the temperature is above 400° C.

Advantageously, the ion conductivity is higher or equal to $10^{-3}$ S/m.

Advantageously, the material used in the present invention is impermeable to $O_2$ and $H_2$ gases.

Advantageously, the material used in the present invention is a material having a level of densification above 88% and preferably higher or equal to 98%. It is advisable to find a compromise between the level of densification, which should be as high as possible (notably for the mechanical resistance of the electrolytes and the gas permeation) and the material capacity to permit the insertion of water. The increase in partial pressure of the steam, which forces the steam into the membrane, compensates for the level of densification increase.

According to one particularly advantageous embodiment, the material permitting the insertion of water is an oxygen-defective oxide, such as an oxygen-defective perovskite acting as a proton conductor.

Advantageously, the oxygen-defective oxide shows stoichiometric intervals and/or is doped.

In fact, non-stoichiometry and/or doping allow the creation of oxygen vacancies. For instance, in the case of proton conduction, the exposition under pressure of a perovskite showing stoichiometric intervals and/or being doped (and so being defective in oxygen), to the water pressure, induces the absorption of water molecules in the structure. The water molecules fill the oxygen vacancies and dissociate in 2 hydroxyl groups according to the following reaction:

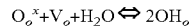

$$O_o^x + V_o^\cdot + H_2O \Leftrightarrow 2OH_o^\cdot$$

Materials referred to as perovskite are the following ones. Simple perovskites, which can be represented by a cubic structure such as the one illustrated in FIG. 3; the chemical formula is $ABO_3$. The oxidation states of the elements contained in the perovskites are in the range of +1 to +3 for A, +2 to +5 for B, as shown below in the Table 1.

TABLE 1

Constitutive elements of an $ABO_3$ structure in the absence of doping element

| Docahedral site A | | Octahedral site B | |
|---|---|---|---|
| $Na^+$ | $Ba^{+2}$ | $Fe^{+3}$ | $Zr^{+4}$ |
| $K^+$ | $Pb^{+2}$ | $Co^{+3}$ | $Ti^{+4}$ |
| $Rb^+$ | $Cu^{+2}$ | $Ni^{+3}$ | $Ce^{+4}$ |
| $Ag^+$ | $Mg^{+2}$ | $Ti^{+3}$ | $Th^{+4}$ |
| $Ca^{+2}$ | $Fe^{+3}$ | $V^{+3}$ | $Mn^{+4}$ |
| $Sr^{+2}$ | $La_{+3}$ | $Cr^{+3}$ | $Ta^{+5}$ |
| | $Pr^{+3}$ | $Mn^{+3}$ | $W^{+5}$ |

It is generally accepted that the oxidation states are +2 for A, +4 for B and −2 for O. Another common form of perovskites is the orthorhombic form. This structure derives from the cubic structure by temperature effects. There are 3 important families where the B element is tetravalent:

perovskites of cerate types (where B=Ce) having the general formula $ACeO_3$;

perovskites of zirconate types (where B=Zr) having the general formula $AZrO_3$;

perovskites of titanate types (where B=Ti) having the general formula $ATiO_3$;

tantalates and diabetes can also be mentioned.

Apart from $ABO_3$, there are other perovskite structures. Double perovskites $A_2BB'O_6$ (with B having an oxidation state of +3 and B' an oxidation state of +5) and triple perovskites $A_3BB'_2O_9$ (with B having an oxidation state of +2 and B' an oxidation state of +5) can be mentioned, whose characteristic is to contain on the B sites, some elements of different stoichiometry. Those structures show some deviations compared to the simple perovskites due to the stoichiometric intervals. For instance, one can observe a modification of the geometry of the octahedrons $BO_6$ or see appearing the formation of oxygen vacancies due to steric hindrance. These structural modifications could influence the proton conduction, notably, if the ability of the hydrogen ions as $H^+(H_2O)$ and $OH^-$ to migrate from one octahedral network to another one is observed.

Perovskites can be doped either on the A site or on the B site by an element referred to as D, advantageously selected from lanthanides Ln or certain metals, alkaline or alkaline earth elements.

The doping element D is preferably ytterbium (Yb) at its oxidation state +III. In fact, $Yb^{3+}$ has the particularity to have an ionic radius close to the one of $Zr^{4+}$. Ytterbium III is very effectively substituted by zirconium IV in the perovskite structure, thus leading to the efficacious formation of oxygen vacancies.

Non-stoichiometric perovskites to be used in the present invention have, for example, the following formula: $A_xB_yO_3$, with x and y being two integers other than 1.

Advantageously,

A represents a metallic atom at an oxidation state comprised between +I and +III, generally at an oxidation state of +II, for example, $Ca^{2+}$, $Ba^{2+}$, or $Sr^{2+}$, B represents a metallic atom at an oxidation state comprised between +III and +V, generally at an oxidation state of +IV, for example, $Zr^{4+}$, $Ce^{4+}$, or $Ti^{4+}$.

For example, a perovskite to be used in the present invention has the formula $SrZr_{0.9}Yb_{0.1}O_{2.95}$ or $BaZr_{0.9}Y_{0.1}O_{2.95}$.

As example, other perovskites well adapted to the present invention can be mentioned, but not limited to:

perovskites of $SrZrO_3$ types doped by one or more rare earth elements, notably by $Y^{3+}$, $Ho^{3+}$, $Er^{3+}$ and/or $Yb^{3+}$;

perovskites of $BaZrO_3$ types doped by at least one earth element, notably by $Yb^{3+}$;

perovskites of $CaZrO_3$ types doped by at least one earth element, notably by $Yb^{3+}$;

perovskites of $SrTiO_3$ types doped by one or more elements, notably by $Al^{3+}$, $Nb^{3+}$, $Sc^{3+}$;

perovskites of $BaTiO_3$ types doped by one or more elements, notably by $Al^{3+}$, perovskites of $CaTiO_3$ types doped by one or more elements, notably by $Al^{3+}$, mixed perovskites of $Sr_{1-x}Ba_xZrO_3$ types doped by one or more rare earth elements, notably by $Yb^{3+}$, mixed perovskites of $Sr_{1-x}Ca_xZrO_3$ types doped by at least one earth element, notably by $Yb^{3+}$, mixed perovskites of $Ca_{1-x}Ba_xZrO_3$ types doped by at least one earth element, notably by $Yb^{3+}$, mixed perovskites of $Sr_{1-x}Ba_xTiO_3$ types doped notably by $Al^{3+}$, mixed perovskites of $Ca_{1-x}Sr_xTiO_3$ types doped notably by $Al^{3+}$, mixed perovskites of $Ca_{1-x}Ba_xTiO_3$ types doped notably by $Al^{3+}$.

It, should be noted that materials other than non-stoichiometric and/or doped perovskites can be used as material promoting the insertion of water and its dissociation in the form of protons and/or hydroxides. For example, crystallographic structures, such as fluorite structures, pyrochlore structures $A_2B_2X_7$, apatite structures $Me_{10}(XO_4)_6Y_2$, oxyapatite structures $Me_{10}(XO_4)_6O_2$ and hydroxyapatite structures $Me_{10}(XO_4)_6(OH)_2$ can be mentioned.

For instance, the pyrochlore structure formed by a tridimensional network of octahedrons $(B_2X_6)$ contains tunnels, cages and oxygen vacant sites allowing for the migration of ions from water.

Likewise, the compact hexagonal structure consisting of apatite tetrahedrons $(XO_4)$ induces the formation of tunnels allowing for the mobility of ions and easy substitutions. Water penetrates into those tunnels, and protons can circulate in them. It should be noted that the apatites can be silicates.

Other families of silicates also need to be taken into consideration.

Aluminosilicates, either as phyllosilicates (clays) or zeolites. The insertion of elements such as $Al^{3+}$ in the silica network $Si^{4+}$ makes this network negatively charged. Cations are inserted in this network to compensate the negative charge. Among those cations, the proton is a good candidate. Conductivities vary depending on the water content and on the spacing between sheets. Ions such as ammonium ion $NH_4^+$ stabilise this water content at high temperatures. Besides, aluminosilicates keep a high water content at high temperatures (300 and 400° C.).

Grafted silicates with oxoacids can also give good results.

Grafted silicates with phosphates can also give some interesting results in almost anhydrous media (20% $H_2O$).

All compounds used as ion conductors at high or intermediate temperatures are, because of their tunnel or sheet structure and/or the presence of vacancies, capable of inserting water which has a small molecular size.

One object of the present invention is to provide a first hydrogen production electrolysis device for the implementation of the method according to the invention, characterised in that it comprises:

an electrolyte as an ion-conductive membrane made of said material permitting the insertion of steam into said membrane, an anode, a cathode, a generator allowing for the application of a potential difference between said anode and said cathode, means for the insertion under pressure of steam into said electrolyte via said anode.

Another object of the present invention is also to provide a second hydrogen production electrolysis device for the implementation of the method according to the invention, characterised in that it comprises:

an electrolyte as an ion-conductive membrane made of said material permitting the insertion of steam into said membrane, an anode, a cathode, a generator allowing for the application of a potential difference between said anode and said cathode, means for the insertion under pressure of steam into said electrolyte via said cathode.

Another object of the present invention is also to provide a first hydrogen purification device for the implementation of the method according to the invention, characterised in that it comprises:

a proton filtration membrane made of said material permitting the insertion of steam into said membrane, means for the insertion under pressure of steam into said membrane via the feed, the said steam pressure being selected so that the potential of the permeate output is higher than the potential on the side of the feed.

Another object of the present invention is also to provide a second hydrogen purification (or pumping) device for the implementation of the method according to the invention, characterised in that it comprises:

a protonic filtration membrane made of said material permitting the insertion of steam into said membrane, an anode, a cathode, a generator allowing for the positive polarisation said anode and the negative polarisation said cathode, means for the insertion under pressure of steam into said membrane via said cathode.

Another object of the present invention is also to provide a first hydrogen fuel cell for the implementation of the method according to the invention, characterised in that it comprises:

an electrolyte as a proton-conductive membrane made of said material permitting the insertion of steam into said membrane, an anode, a cathode, means for the insertion under pressure of steam into said electrolyte via said anode, the said stem pressure being selected so that the potential of said cathode is higher than the potential of said anode.

Another object of the present invention is also to provide a second hydrogen fuel cell for the implementation of the method according to the invention, characterised in that it comprises:
- an electrolyte as an ion-conductive membrane made of said material permitting the insertion of steam into said membrane,
- an anode,
- a cathode,
- means for the insertion under pressure of steam into said electrolyte via said cathode.

BRIEF DESCRIPTION OF THE DRAWINGS

Further characteristics and advantages of the invention will become evident from the following detailed description that is merely illustrative and not limitative, in reference to the figures attached hereto, wherein:

FIGS. 1 and 2 show simplified schematic representations of an electrolyser;

FIG. 3 shows a simple perovskite structure $ABO_3$;

In all the figures, the common elements have the same reference numbers.

FIGS. 1 and 3 have previously been described in reference to the state of the technique.

FIG. 4 represents four ATG-ATD analysis (thermogravimetric analysis coupled to a thermodifferential analysis) a, b, c and d, performed respectively on:

a. a $ABO_3$ type perovskite hydrated with a steam pressure of 15 bars at 200° C.,
b. a non-hydrate $AB_{0.9}Ln_{0.1}O_{2.95}$ type perovskite à 200° C.,
c. a $AB_{0.9}Ln_{0.1}O_{2.95}$ type perovskite hydrated with a steam pressure of 15 bars under $N_2$ atmosphere at 200° C.,
d. a $AB_{0.9}Ln_{0.1}O_{2.95}$ type perovskite hydrated with a steam pressure of 15 bars under $O_2$ atmosphere at 200° C.

An ATG-ATD analysis is an analysis allowing for the measurement of weight variation of a sample depending on the temperature.

From graphs a and b, there is no weight loss observed on the perovskites which are:
- non-doped (case a), or
- non-hydrated under steam pressure (case b).

From graphs c and d, four well marked weight losses are observed depending on the increase of temperature. The temperatures corresponding to those four weight losses are determined by the inflexion points on the graphs c and d and are about 150, 350, 700 and 800° C., respectively. The first two weight losses correspond to the loss of water molecules absorbed on the surface of the perovskites. The third and fourth weight losses of about 0.33% correspond to inserted and mobile ionic entity losses in the perovskites, such as $H^+$ or $OH^-$ ions. It is interesting to notice that above 800° C., a weight gain is observed on graph d, corresponding to the sample under $O_2$. This phenomenon is explained by the fact that the vacancies on the perovskite (dehydrated at 800° C.) are filled again by $O^{2-}$ oxide ions; the conduction is then provided by the $O^{2-}$ ions. It should be noted that inflexion points depend, of course, on the material selected and the transition temperature from $H^+$ or $OH^-$ conduction to $O^{2-}$ conduction depends on this material.

It should be noted that the perovskites analysed here are perovskites having a level of densification of 88%. The water filling level for the perovskites c and d is 100%. Similar analysis performed on perovskites having a level of densification of 98% show a water filling level of 75%. Therefore, it can be noticed that a higher densification (which can be interesting for making electrolytes) slows down the insertion of water into the perovskite (however, the increase in densification is not an obstacle to the insertion of water).

Figure 4:
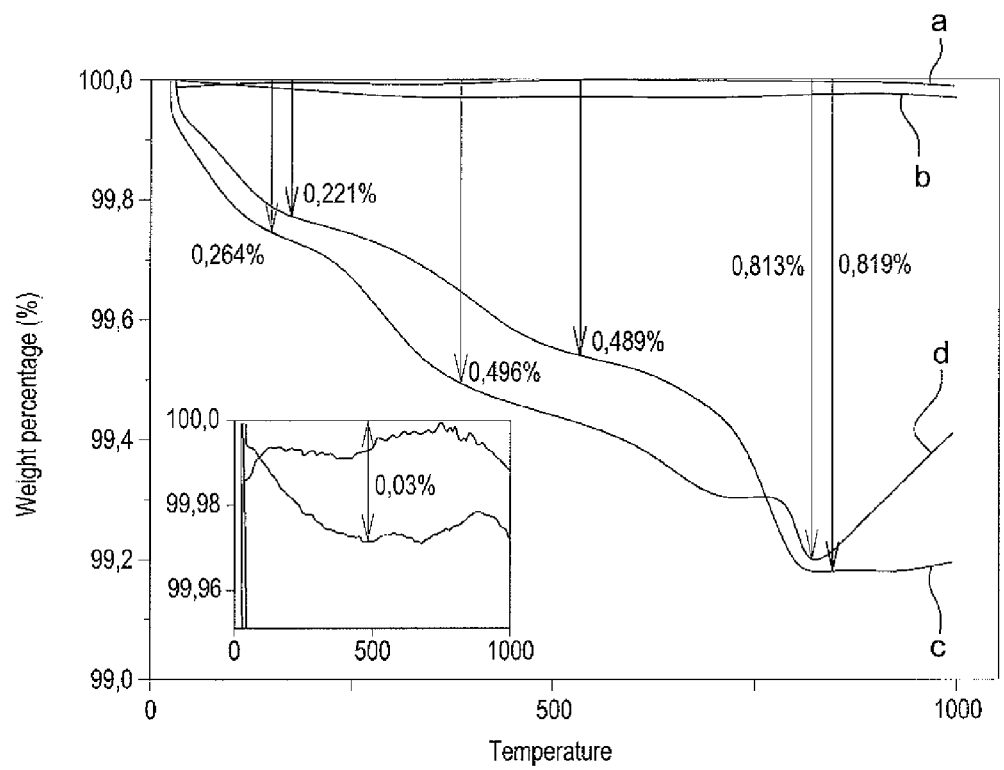
FIG. 4 represents the thermogravimetric analysis results performed on different perovskite samples.

In summary, FIG. 4 shows that:
the conduction in perovskites:
- is due to the insertion of water and to the ion mobility ($H^+$ and $OH^-$ then $O^{2-}$ at higher temperatures),
- works preferentially with doped perovskites (or eventually non-stoichiometric ones) in order to form vacancies in the crystallographic structure;
a pressure higher or equal to 15 bars is necessary to obtain a water filling level of 100% in a perovskite densified at 88% and a water filling level of 75% in a perovskite densified at 98%.

Figure 5:
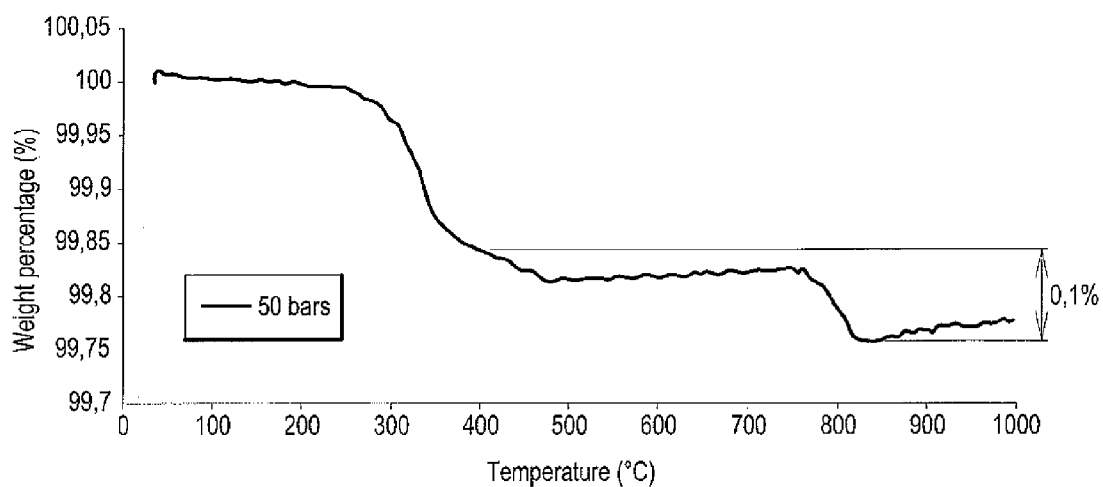
FIG. 5 represents the thermogravimetric analysis results in pressure on a sample presenting a level of densification close to 100%.

FIG. 5 represents an ATD-ATG analysis of a sample having a densification close to 100%. This analysis shows that 50 bars of pressure (during 36 hours) are needed to obtain a vacancy filling of 40%.

The method according to the present invention aims at optimising the conductivity of the membrane using advantageously the previous conclusions and forcing the steam into the membrane under a certain pressure in order to obtain the desired conductivity at a given temperature.

Figure 6:
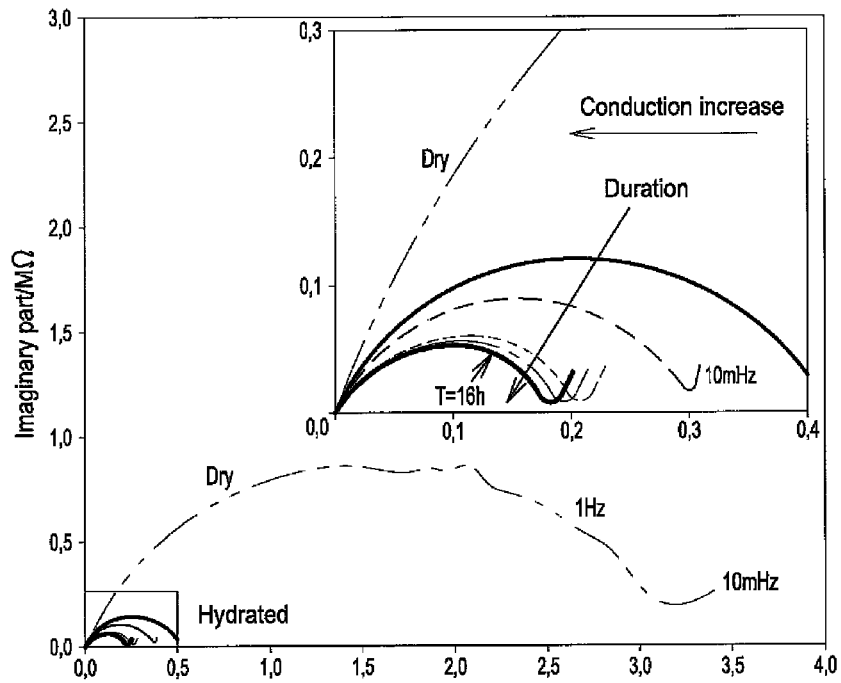
FIGS. 6, 7 and 8 represent a plurality of Nyquist diagrams illustrating the role of pressure on the method of the present invention.

FIG. 6 represents different Nyquist diagrams obtained with a pellet of $SrZr_{0.9}Yb_{0.1}O_{2.95}$ perovskite densified at 88%, placed in an oven at 400° C. under a continuous argon flow humidified at a pressure below 1 atm. The different diagrams correspond each to a specific time condition during which the argon flow is performed: going from a diagram obtained with a dry pellet, i.e., with zero humidified argon flow duration to a diagram obtained with a pellet having a humidified continuous argon flow duration of t=16 h.

The different Nyquist diagrams are obtained by an electrochemical technique of impedance spectroscopy more and more used in the study of materials. The principle of the impedance spectroscopy lies in the application of low sinusoidal voltage overlaid on the nominal voltage and the amplitude and phase shift analysis of the response current. The amplitude voltage/current ratio defines the impedance modulus $|Z|$ and the phase shift between the voltage and the current completes the information to give access to real and imaginary parts of complex impedance Z. During the measures, a fairly large range of frequencies is scanned. The results are shown on a Nyquist diagram $Im(Z)$ depending on $Re(Z)$. The experimental results are correlated to a model, in order to verify their validity.

An enlargement of the Nyquist diagrams for the real part. $Re(Z)$ ranging from 0 to 0.4 MΩ is illustrated in FIG. 6.

Each diagram has substantially an arc of circle form; in the first approximation (corresponding to a modelisation of the pellet according to a parallel RC filter), the pellet resistance is given by the diameter of the corresponding circle. Consequently, a reduction of the resistance (and therefore an increase of conductivity) is observed as the humidified argon flow duration increases.

Figure 7:
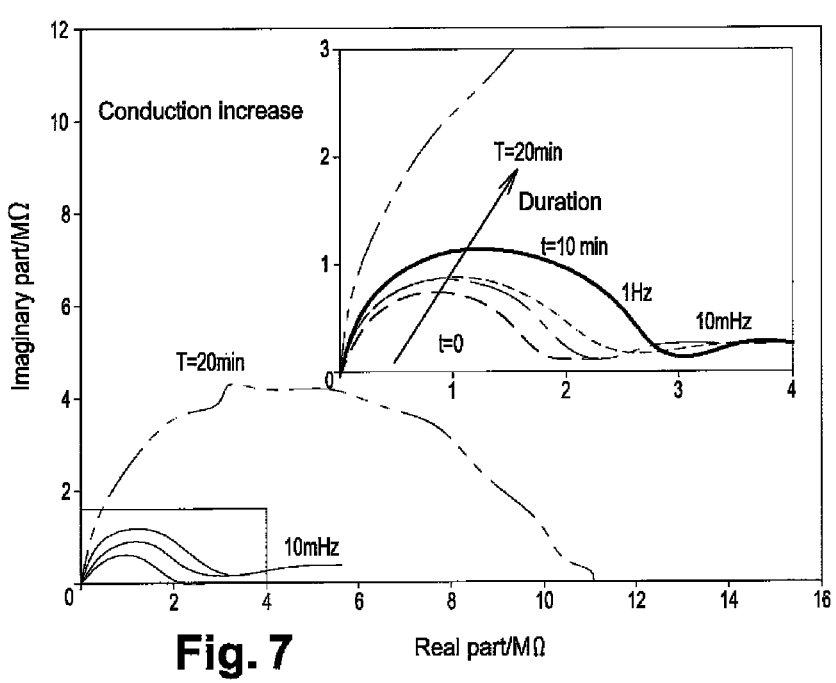

FIG. 7 represents different. Nyquist diagrams obtained with a pellet of $SrZr_{0.9}Yb_{0.1}O_{2.95}$ perovskite densified at 88%, therefore, identical to the pellet tested in FIG. 6, but which has been previously saturated with water in an autoclave (pre-pressurization under 15 bars of water at 200° C.). Again, this pellet is placed in an oven at 400° C. under a continuous humidified argon flow. The different diagrams correspond each to a specific duration condition during which the argon flow is performed. A reduction of conductivity is observed as the flow duration increases. Therefore, despite a humidified argon flow, the conductivity reduces.

The analysis of FIGS. 6 and 7 tends to show that the perovskite acts like a "sponge": in the case of FIG. 6, water penetrates in the pellet and the conductivity increases with time; in the case of FIG. 7, water leaves the pellet, which is already pre-pressurized and the conductivity reduces with time.

In summary, FIGS. 6 and 7 show that:
the conductivity increases with the insertion of water (under an argon flow from a dry pellet);
the reversibility of the insertion and the desorption of water with a pellet which acts like a "sponge" between a progressive hydration process (and an increase in conductivity) and a progressive dehydration state (and a reduction in conductivity),
in order to obtain a good conductivity, it is necessary to force under pressure the insertion of water in the pellet.

Figure 8:
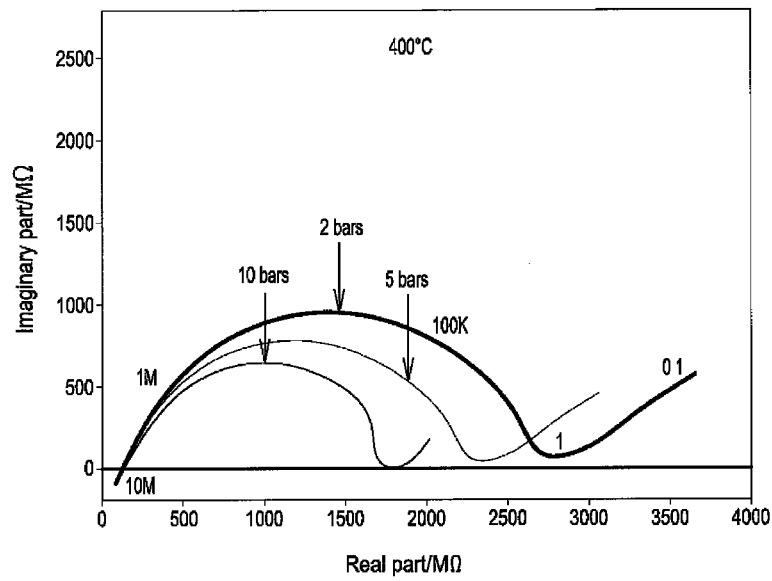

FIG. 8 represents different Nyquist diagrams obtained with a pellet of $SrZr_{0.9}Yb_{0.1}O_{2.95}$ perovskite under different pressures (corresponding to steam pressures of 2, 5 and 10 bars). The measures are performed at 400° C. It is observed that the conductivity increases with pressure.

Figure 9:
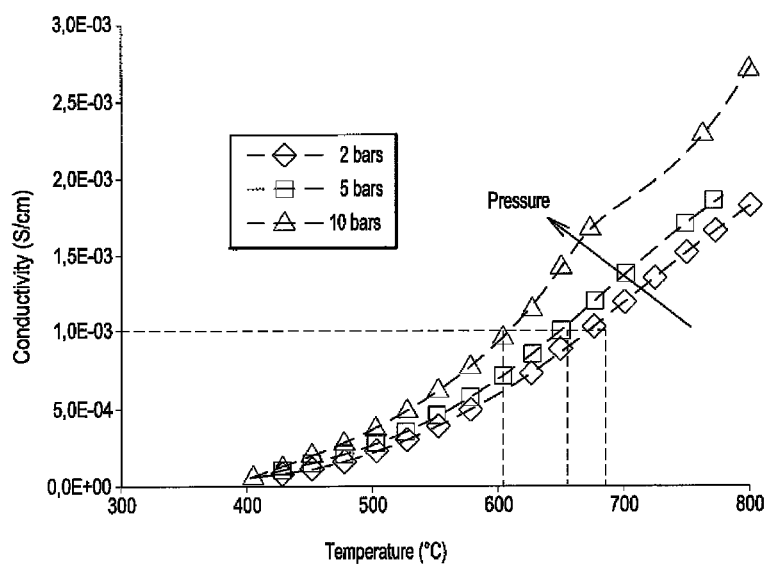
FIG. 9 represents a plurality of conductivity graphs depending on the temperature illustrating the role of pressure on the method of the present invention.

This behaviour is confirmed by FIG. 9 which represents three conductivity graphs depending on the temperature obtained on the pellet of $SrZr_{0.9}Yb_{0.1}O_{2.95}$ perovskite under three different steam pressures, 2, 5 and 10 bars, respectively. FIG. 9 clearly illustrates the increase in conductivity with pressure A conductivity of about $10^{-3}$ S/cm is obtained for a pressure of 10 bars at a temperature of about 600° C. To obtain the same conductivity at 5 bars, a temperature of about 650° C. is required; at 2 bars, the temperature increases to 675° C. A new pressure increase allows for the obtaining of conductivities higher or equal to $10^{-2}$ S/cm. The same comportment has been observed with other perovskites, such as $BaZr_{0.9}Y_{0.1}O_{2.95}$.

In other words, to obtain a given conductivity, it is possible to work at lower temperatures by increasing the steam pressure in the perovskite. This result shows a considerable advantage in that it allows avoiding the use of material operating at higher temperatures.

The increase in temperature causes an increase in ion species mobility, providing conductivity but having also the effect of dehydrating the perovskite. The perovskite dehydration is balanced by the maintenance of perovskite under water pressure.

Figure 10:
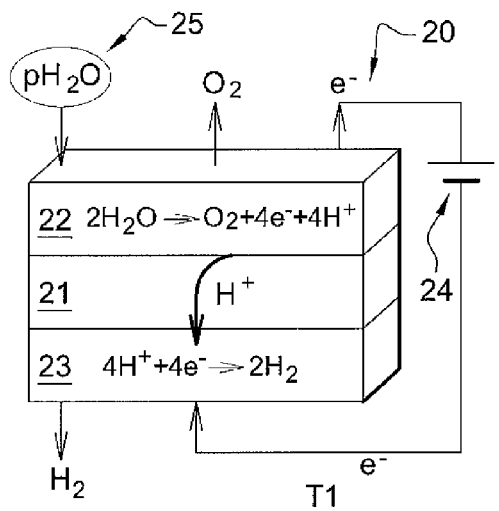
FIGS. 10 and 11 represent each, in a simplified and schematic manner, an embodiment of an electrolysis device using the method of the present invention.
Figure 11:
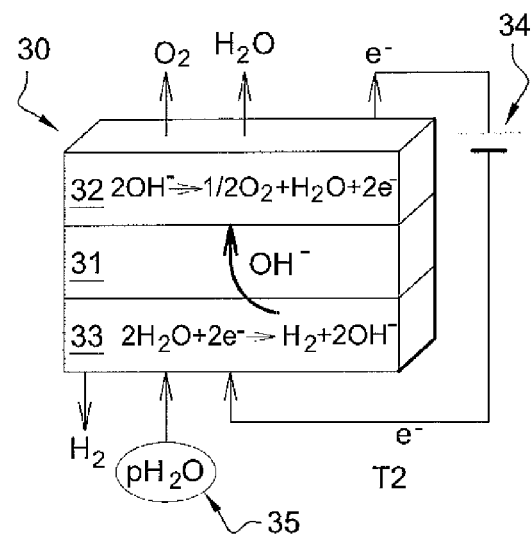

FIGS. 10 and 11 represent each, in a simplified and schematic manner, an embodiment of a hydrogen production electrolysis device, (20) and (30), respectively, using the method according to the invention.

The electrolysis device (20) in FIG. 10 is substantially identical to the device (10) in FIG. 2. Therefore, this device (20) comprises:
a proton conductive ceramic membrane (21) made of said material permitting the insertion of steam into said membrane and providing a separating electrolyte function,
an anode (22),
a cathode (23),
a generator (24) imposing a potential difference between the anode (22) and the cathode (23).

The proton-conductive membrane is made of a material promoting the insertion of water, such as a doped perovskite material of general formula $AB_{1-x}D_xO_{3-x/2}$. The materials used for the anode and the cathode are cermets (mixture of metal and perovskite material used for the electrolyte). The membrane is preferably impermeable to $O_2$ and $H_2$ gases.

The device (20) further comprises means (25) permitting the insertion under pressure of water into the membrane (21) via the anode (22), with the steam pressure being preferably at least above 15 bars, even higher or equal to 50 bars. It is important to mention that the total imposed pressure in the compartment will have to be compensated in the other compartment in order to have a pressure difference between the two compartments of about 10 bars to avoid membrane rupture. Therefore, in FIG. 10, the $H_2$ pressure can be increased.

The T1 operating temperature of device (20) depends on the type of material used for the membrane (21); in any case, this temperature is above 400° C. and generally below 650° C., even below 600° C. This operating temperature corresponds to a conduction provided by $H^+$ protons.

The $H_2O$ steam under pressure is oxidised at the anode (22). The steam is dissociated to form oxygen ($O_2$) and $H^+$ ions, this reaction releases electrons ($e^-$). The $H^+$ ions cross the electrolyte (21) to form hydrogen ($H_2$) on the surface of the cathode (23).

The use of the method according to the present invention permits notably to increase the $H^+$ ions conductivity.

The electrolysis device (30) in FIG. 11 has a similar structure than device (20) in FIG. 8. It comprises:
an anode (32);
a cathode (33),
an electrolyte (31) as an ion-conductive membrane made of said material permitting the insertion of steam into said membrane,
a generator (34) imposing a potential difference between the anode (32) and the cathode (33),
means (35) permitting the insertion under pressure of water in the membrane (31) via the cathode (33).

The T2 operating temperature of device (30) is higher than the T1 operating temperature of device (20) of FIG. 10; T2 is generally above 600° C. and below 850° C., and corresponds to a conductivity provided by $OH^-$ ions. Again, the injection of steam under pressure permits notably to increase the conductivity. The injection is performed via means (35) at the cathode (33). At the cathode (33), water is reduced by capturing electrons to form hydrogen. $OH^-$ ions cross the electrolyte (31) and are oxidised at the anode (32) to form $O_2$, $H_2O$ and electrons. In the same way as for device (20) of FIG. 10, it can be necessary to counterbalance pressures.

Figure 12:
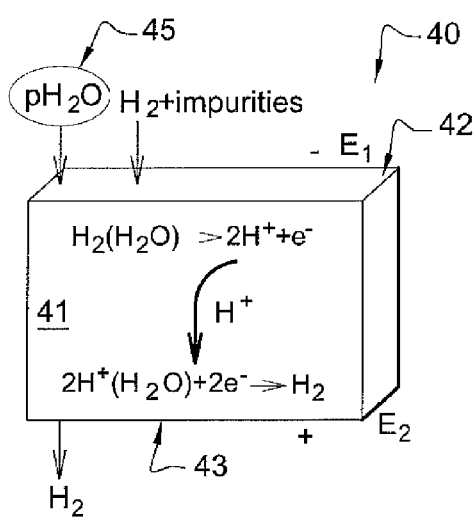
FIGS. 12 and 13 represent each, in a simplified and schematic manner, an embodiment of a hydrogen purification device using the method of the present invention.
Figure 13:
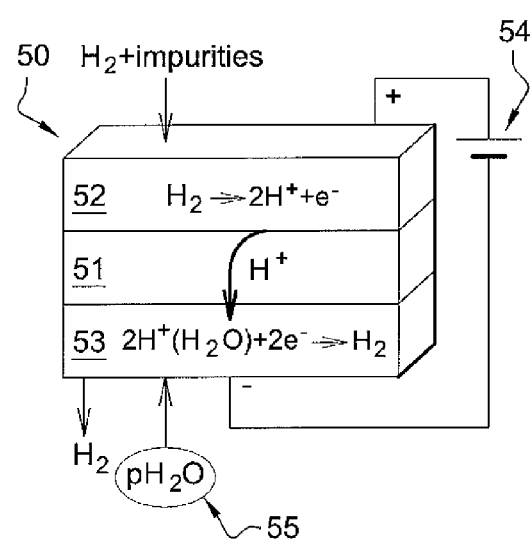

FIGS. 12 and 13 represent each, in a simplified and schematic manner, an embodiment of a hydrogen purification device (40) and (50), respectively, using the method according to the present invention.

The purification device (40) in FIG. 12, comprises:
a proton filtration membrane (41) made of a material permitting the insertion of steam into the membrane, means (45) permitting the insertion under pressure of water in the membrane (41) via a feed (42).

The proton filtration membrane (41) is made of a material comprising a mixture of metal and perovskite.

On the side of the feed (42), a mixture of hydrogen ($H_2$) and impurities (such as $CO_2$, CO, $CH_4$ carbon-based products) is injected under pressure, the function of device (40) being to separate $H_2$ from impurities in order to provide on the permeate side pure hydrogen ($H_2$). Only $H^+$ protons diffuse by a concentration gradient into the proton membrane (41) towards the permeate output (43). The metal in the membrane allows for the percolation of electrons towards the permeate output (43); a reduction in protons by electrons is then observed at the permeate output (43) in order to recuperate pure hydrogen.

Means (45) permit the increase of proton conductivity. In the other hand, water pressure on the anodic side will tend to increase the potential $E_1$ on the side of the alimentation (42). In order for the device (40) to work, it is acknowledged that the potential $E_2$ on the permeate side should always be higher than the potential $E_1$. Consequently, it is advisable to choose a water pressure so that the potential $E_2$ is always higher than $E_1$.

In FIG. 13, the purification device (50), comprises:
an anode (52),
a proton filtration membrane (51) made of said material permitting the insertion of steam into the membrane,
a cathode (53),
means (55) permitting the insertion under pressure of water in the membrane (51) via the cathode (53),
a generator (54) positively polarising the anode (52) and negatively polarising the cathode (53).

On the side of the anode (52), a mixture of hydrogen ($H_2$) and non-oxidised impurities (such as, for example, methane) is injected under pressure, the function of the device being to separate $H_2$ from impurities in order to provide on the side of the cathode (53) pure hydrogen ($H_2$). Again, the injection of steam under pressure permits the increase of proton conductivity. It should be noted that this device will operate even better if the $H_2$ pressure on the anodic side is high. Moreover, this device (50) can also be used as a hydrogen pump; in other words, it can be used to extract hydrogen from a system (in this case, hydrogen is not necessarily mixed with impurities on the anodic side).

Figure 14:
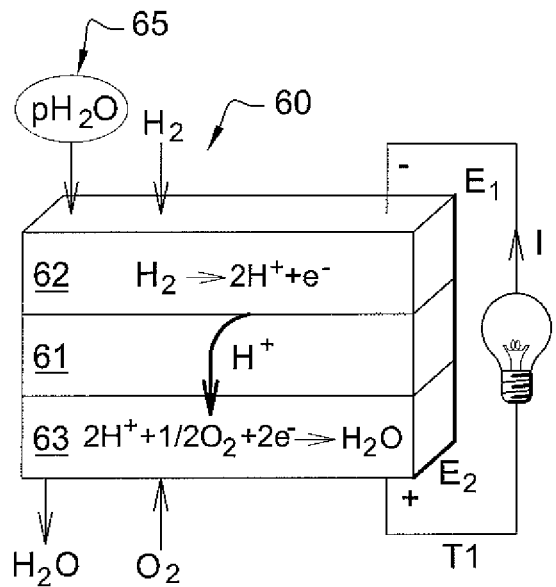
FIGS. 14 and 15 represent each, in a simplified and schematic manner, an embodiment of a hydrogen fuel cell using the method of the present invention.
Figure 15:
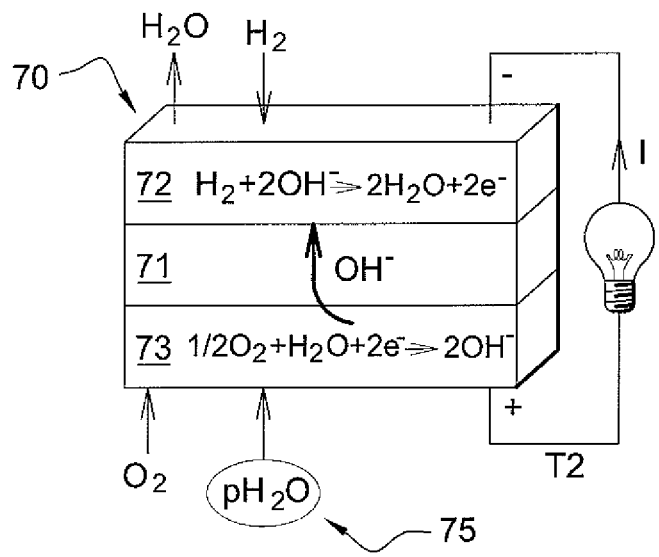

FIGS. 14 and 15 represent each, in a simplified and schematic manner, an embodiment of a hydrogen fuel cell (60) and (70), respectively, using the method according to the present invention.

In FIG. 14, the hydrogen fuel cell (60) comprises:
an anode (62),
a cathode (63),
a proton-conductive membrane (61) made of said material permitting the insertion of steam into the membrane,
means (65) permitting the insertion under pressure of water in the electrolyte (61) via the anode (62).

The electrodes (62) and (63) use catalysts to activate on one side the oxidation reaction of hydrogen, and on the other side, the reductive reaction of oxygen. Hydrogen introduced at the anode (62) is dissociated into protons and electrons. The improvement of proton insertion in the membrane (61) (and, therefore, conductivity) is again provided by means (65) permitting the insertion of steam pressure in the electrolyte (61) via the anode (62). At the cathode (63), oxygen, electrons and protons are recombined to form water.

The water pressure on the anodic side will tend to increase the potential $E_1$ on the anodic side. In order for the cell (60) to work, it is acknowledged that the potential $E_2$ on the cathodic side should always be higher than the potential $E_1$. Consequently, it is convenient to select the water pressure so that the potential $E_2$ is always higher than $E_1$. Both water pressures can be identical.

The T1 operating temperature of cell (60) depends on the type of material used for the membrane (61); in any case, this temperature is always above 400° C. and generally below 650° C., even below 600° C. This operating temperature corresponds to a conduction provided by $H^+$ protons.

In FIG. 15, the hydrogen fuel cell (70) comprises:
an anode (72),
a cathode (73),
an electrolyte (71) as an ion-conductive membrane made of said material permitting the insertion of steam into said membrane,
means (75) permitting the insertion under pressure of water in the electrolyte (71) via the cathode (73).

The T2 operating temperature of device (70) is higher than the T1 operating temperature of device (60) in FIG. 12 so that the conductivity is provided by the mobility of $OH^-$ ions: the conductivity is increased by the injection under pressure of steam by means (75). The electrodes (72) and (73) use catalysts to activate on the cathodic side the reaction: $\frac{1}{2}O_2 + H_2O + 2e^- \rightarrow 2OH^-$ and on the anodic side, the reaction: $H_2 + 2OH^- \rightarrow 2H_2O + 2e^-$.

Unlike for cell (60), the increase in steam pressure is not limited by the potential difference between the two electrodes and it is, therefore, possible to increase the pressure without limitation in order to increase the conductivity.

In each of the previously described devices, it can be necessary to counterbalance the steam pressure to avoid a ceramic rupture. This counter-pressure will depend on the membrane thickness.

It is evident that the present invention is not limited to this above disclosed embodiment.

In particular, we have mentioned few times the steam pressure but it should be noted that when the steam is part of a gaseous mixture, it should be referred to as partial pressure of steam: it is the increase in partial pressure of steam which increases the conductivity at a given temperature.

Moreover, the above described applications use temperatures higher or equal to 400° C.; however, it should be noted that the operating temperature depends on the material used. Therefore, for example, in the case of aluminosilicates, the operating temperature can be below 400° C. (for example, about 300° C.).

Finally, any means can be replaced by an equivalent means.

The invention claimed is:

1. A method for obtaining a desired proton conductivity in a device at a given operating temperature in a conductive membrane, said method comprising: providing a conductive membrane made of a material permitting the insertion of steam through said membrane, providing an operating temperature between 300° C. and 600° C. to obtain a conduction provided by H+ ions through said membrane; forcing steam through said membrane by providing a pressurized gaseous flow containing the steam, said pressurized gaseous flow being pressurized to between 10 to 100 bar, whereby increasing the pressure of the gaseous flow reduces the operating temperature required in order to obtain the same desired proton conductivity.

2. A method according to claim 1, wherein said partial pressure of steam is higher or equal to 15 bars.

3. A method claim 1, wherein the proton conductivity is higher or equal to $10^{-3}$ S/m.

4. A method claim 1, wherein said material is impermeable to $O_2$ and $H_2$ gases.

5. A method according to claim 1, wherein said material is a material having a level of densification above 88%.

6. A method according to claim 1, wherein said material has a level of densification higher or equal to 98%.

7. A method according to claim 1, wherein said material permitting the insertion of water is an oxygen-defective oxide.

8. A method according to claim 1, wherein said oxygen-defective oxide shows stoichiometric intervals and/or is doped in order to allow the creation of oxygen vacancies.

9. A method according to claim 7, wherein said oxygen-defective oxide is a perovskite.

10. A method according claim 9, wherein said perovskite has the following formula: $AB_{1-x}D_xO_{3-x/2}$, wherein D is a doping element.

11. A method according to claim 10, wherein the doping element D is selected from lanthanides, alkaline or alkaline earth elements.

12. A method according to claim 11, wherein the doping element D is preferably ytterbium Yb at its oxidation state of +III.

13. A method according to claim 9, wherein said perovskite is a non-stoichiometric perovskite having the following formula: $A_xB_yO_3$, x and y being two integers other than 1.

14. A method according to claim 10, wherein A represents a metallic atom at an oxidation state comprised between +I and +III and B represents a metallic atom at an oxidation state comprised between +III and +V.

15. A method according to claim 14, wherein A represents a metallic atom at an oxidation state of +II, such as $Ca^{2+}$, $Ba^{2+}$, or $Sr^{2+}$ and B represents a metallic atom at an oxidation state of +IV, such as $Zr^{4+}$, $Ce^{4+}$, or $Ti^{4+}$.

16. A method according to claim 15, wherein said perovskite has the formula $SrZr_{0.9}Yb_{0.1}O_{2.95}$ or $BaZr_{0.9}Y_{0.1}O_{2.95}$.

17. A method according to claim 1, wherein said material, used as a material permitting the insertion of water, has a crystallographic structure selected from the following structures: fluorite, pyrochlore or apatite.

18. Hydrogen production electrolysis device for the implementation of the method according to claim 1, comprising:
an electrolyte as an ion-conductive membrane made of said material permitting the insertion of steam into said membrane,
an anode,
a cathode,
a generator allowing for the application of a potential difference between said anode and said cathode, and
means for the insertion under pressure of steam into said electrolyte via said anode.

19. Hydrogen production electrolysis device for the implementation of the method claim 1, comprising:
an electrolyte as an ion-conductive membrane made of said material permitting the insertion of steam into said membrane,
an anode,
a cathode,
a generator allowing for the application of a potential difference between said anode and said cathode,
means for the insertion under pressure of steam into said electrolyte via said cathode.

20. Hydrogen purification or pumping device for the implementation of the method claim 1, comprising:
a protonic filtration membrane made of said material permitting the insertion of steam into said membrane,
means for the insertion under pressure of steam into said electrolyte via the feed, said steam pressure being selected so that the potential (E2) of the permeate output is higher than the potential (E1) on the side of the feed.

21. Hydrogen purification or pumping device for the implementation of the method according to claim 1, comprising:
a protonic filtration membrane made of said material permitting the insertion of steam into said membrane,
an anode,
a cathode,
a generator allowing for the positive polarization said anode and the negative polarization said cathode, and
means for the insertion under pressure of steam into said membrane via said cathode.

22. Hydrogen fuel cell for the implementation of the method according claim 1, comprising:
an electrolyte as an ion-conductive membrane made of said material permitting the insertion of steam into said membrane,
an anode,
a cathode,
means for the insertion under pressure of steam into said electrolyte via said anode, said steam pressure being selected so that the potential (E2) of said cathode is higher than the potential (E1) of said anode.

23. Hydrogen fuel cell for the implementation of the method claim 1, comprising:
an electrolyte as an ion-conductive membrane made of said material permitting the insertion of steam into said membrane,
an anode,
a cathode,
means for the insertion under pressure of steam into said electrolyte via said cathode.

* * * * *